Feb. 26, 1963 A. J. RAKOWSKI 3,078,550
METHOD OF ADJUSTING THE RESISTANCE OF THERMISTOR ELEMENTS
Filed June 25, 1959
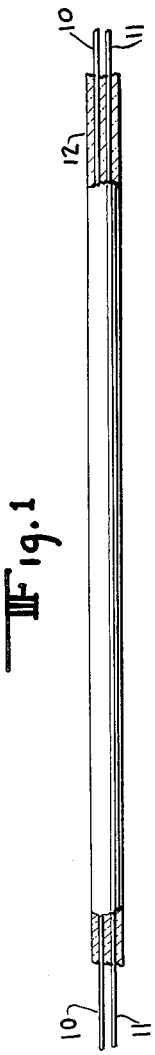
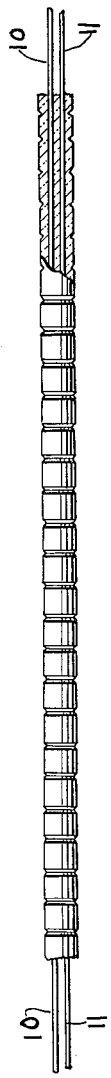
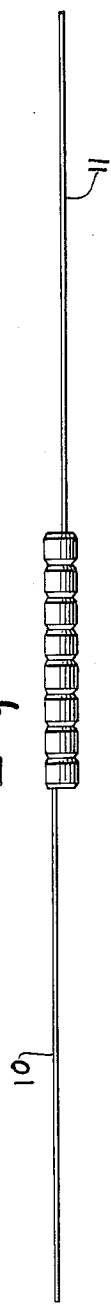
INVENTOR.
ALEXANDER J. RAKOWSKI
BY
J. William Carson
ATTORNEY United States Patent Office 3,078,550
Patented Feb. 26, 1963

3,078,550
METHOD OF ADJUSTING THE RESISTANCE
OF THERMISTOR ELEMENTS
Alexander J. Rakowski, Towaco, N.J., assignor to Specialties Development Corporation, Belleville, N.J., a corporation of New Jersey
Filed June 25, 1959, Ser. No. 822,784
4 Claims. (Cl. 29—155.63)

The present invention relates to thermistor elements of the spot type, and, more particularly, to a method of adjusting the resistance of a batch of elements to an equal and stable value.

Thermistors are thermally sensitive resistors usually composed of metallic oxides which vary appreciably in electrical resistance with changes in temperature. So called spot-thermistors are utilized in electrical networks to compensate for ambient temperature changes which affect the resistance values of other components in the network, and for many other purposes. It is therefore essential that the behavior of all similarly rated spot-thermistors is identical or at least within prescribed tolerances.

Heretofore, great difficulty has been experienced in producing a high yield of elements which had the resistance characteristics for which they were to be rated, even with the plus or minus 20% tolerance allowed for resistance type elements. Consequently, a large percentage of elements were rejected, whereby the manufacturing cost of the elements which passed inspection was increased. Also, it has been found that elements having equal resistance values at the time of inspection had different values at some later time. Usually, an increase in resistance was noted which is believed to be due to aging upon exposure to the higher temperatures within the operating range of the elements.

Accordingly, an object of the present invention is to produce a high yield of spot-thermistor elements which have like characteristics within a prescribed range of tolerances and thereby reduce manufacturing costs.

Another object is to produce such elements which have stable characteristics whereby proper functioning thereof is assured.

Another object is to provide such elements of which a large percentage has within batch and batch-to-batch uniformity.

A further object is to provide a simple, practical and economical method of producing such elements.

Other and further objects of the invention will be obvious upon an understanding of the illustrative embodiment about to be described, or will be indicated in the appended claims, and various advantages not referred to herein will occur to one skilled in the art upon employment of the invention in practice.

In the drawing:

FIG. 1 is an enlarged fragmentary elevational view, partly in section, illustrating a portion of a continuous length of thermistor material formed on a pair of electrically conductive wires.

FIG. 2 is a view similar to FIG. 1 illustrating the thermistor material after being notched to provide bead-like sections.

FIG. 3 is an enlarged elevational view of a thermistor element produced by removing certain of the bead-like sections and severing the wires.

Referring to the drawing in detail, a portion of a continuous length of an assembly from which thermistors are produced is shown in FIG. 1, which comprises a pair of parallel spaced apart, electrically conductive wires 10 and 11, and a mass of thermistor material 12 formed on the wires and having a substantially uniform cross-sectional area throughout its length. The thermistor material is pugged and the mass is extruded onto the wires in the form of a stiff paste and adheres to the wires as shown.

In FIG. 2, the mass 12 is shown notched at lengthwise spaced apart points to form a series of partially connected bead-like sections. The bead-like sections are dried to firmly secure them onto the wires and thereby facilitate further handling of the assembly.

The mass of thermistor material is composed of one or more metallic oxides which have the resistance characteristics of thermistors. A suitable composition is a mixture of between about 80% and about 98% of manganese dioxide and between about 20% and about 2% cupric oxide. As a specific example, a composition consisting of a mixture of 90% manganese dioxide and 10% cupric oxide was used in the test about to be described.

Several lengths of the assembly were passed through a forty inch oven, some at a rate of twelve inches a minute and others at a rate of eighteen inches a minute, while maintaining the oven at 1990°, 2035°, 2080°, 2130° and 2175° F., respectively, for both rates, whereby the lengths were fired at any given point at such temperatures for about three minutes and about two minutes, respectively.

As shown in FIG. 3, the fired lengths were then processed to remove bead sections from the wires and to leave eight beads on the wires, and the wires 10 and 11 were severed to leave a length of wire 10 at one end and a length of wire 11 at the other end to thereby produce thermistor elements comprising a body and terminal wires embedded in the body.

The thermistor elements so formed had the following dimensions:

| | In. |
|---|---|
| Body length | 0.5000 |
| Bead length | 0.0625 |
| Bead diameter | 0.0652 |
| Wire diameter | 0.0100 |
| Space between wires | 0.0100 |

It will be understood that the elements could have more or less than eight beads.

The resistances of these elements between the terminal wires 10 and 11 were measured at 77° F. and were plotted against the firing temperatures. It was found that, at both rates of moving the assembly through the oven, the elements which were fired at 2080° F. had the highest resistance, that the elements which were fired at 1990° and 2175° F. had the lowest resistance, and that the elements which were fired at 2035° and 2130° F. had an intermediate resistance. It was also found that these plots produced peaks at between about 2065° and about 2100° F., thereby indicating that elements fired within this range would have a resistance of at least 98% of the maximum attainable resistance within the range of atmospheric temperatures. This resistance may be referred to as the nominal resistance of the elements.

A number of lengths of the beaded assembly (FIG. 2) were fired at 2080° F. at speeds of twelve and eighteen inches a minute, and elements such as shown in FIG. 3 were produced and forty elements were picked at random from each length. The resistances of these elements were measured, and the average resistance of the elements from each length and the percentage of elements having a resistance within plus or minus 10% of the average resistance was computed. The results thereof are given in the table about to follow.

| Length No. | Batch No.[1] | Firing Speed, Ins. 1 Min. | Avg. R At 77°F., K ohms | Yield ± 10% Tolerance |
|---|---|---|---|---|
| | | | | Percent |
| 1 | 2 | 12 | 15.1 | 96 |
| 2 | 2 | 12 | 14.7 | 96 |
| 3 | 1 | 12 | 13.5 | 78 |
| 4 | 1 | 12 | 14.5 | 78 |
| 5 | 2 | 18 | 14.1 | 74 |
| 6 | 2 | 18 | 12.8 | 94 |
| 7 | 1 | 18 | 12.0 | 96 |
| 8 | 1 | 18 | 12.8 | 89 |

[1] 90% manganese dioxide, technical grade; 10% cupric oxide, technical grade.

At least one element of each length was reheated to about 1250° F. and was allowed to cool to 77° F. The resistances of these elements at 77° F. before and after reheating did not vary more than 1% in any instance and remained within the tolerance of plus or minus 10%.

After the thermistor elements are formed as shown in FIG. 3, a moisture proof coating is applied thereto. A coating of glass is preferred because it can be applied with uniformity of coating thickness by electrophoretic processes which can be accurately controlled.

Tests were made with a thermistor material comprising 95% manganese dioxide and 5% cupric oxide, and lengths of assemblies of this material were fired at different temperatures while passing through the oven at the rate of twelve inches a minute. It was found that this material had an optimum firing temperature of 2125 and a nominal resistance of 130 kilohms at 77° F.

Further tests were made with other metallic oxide type thermistor materials and it was found that they too had an optimum firing temperature and a firing time ranging from one to three minutes at which they could adjust to a maximum resistance and could be stabilized.

From the foregoing description, it will be seen that the present invention provides a simple, practical and economical method of adjusting and stabilizing the resistance of thermistor elements.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. The method of adjusting the resistance of a length of thermistor material consisting essentially of a mixture of metallic oxides having thermistor characteristics, which method comprises forming a continuous length of thermistor material of substantially uniform cross-sectional area throughout its length on a pair of electrically conductive wires embedded therein, notching the length of thermistor material at lengthwise spaced apart points to form a series of partially connected bead-like sections, drying the bead-like sections to firmly secure the same onto the wires, continuously passing the length of bead-like sections on the wires lengthwise at a constant rate of at least about one foot a minute through a heated zone maintained at a constant temperature of a value to give each bead-like section a predetermined resistance value, each bead-like section thereby being in the zone while passing therethrough for an equal predetermined substantial period of time to adjust the same to the predetermined resistance value, continuously removing the length of bead-like sections on the wires from the zone after passing therethrough removing certain of the bead-like sections from the wires and permitting others to remain secured thereon, and severing the wires to produce an individual thermistor element having terminal wires embedded therein, said method being characterized that each thermistor element produced from the same length of thermistor material is subjected to identical temperature conditions during the steps of extruding, notching, drying, passing through the heated zone and fabrication into an individual element, whereby at least 74% of thermistor elements formed from the same length of thermistor material having a resistance which does not vary more than ±10% from the average resistance of the elements produced from each length which resistance is unaltered after reheating the thermistor elements and cooling the same to a temperature within the range of atmospheric temperatures.

2. The method according to claim 1, wherein the thermistor material consists essentially of between about 80% and about 98% manganese dioxide and between about 20% and about 2% cupric oxide, the zone is at a constant temperature of between about 2065° F. and about 2125° F., and each bead-like section is subjected to such temperature for about two minutes.

3. The method according to claim 2, wherein the thermistor material consists essentially of about 90% manganese dioxide and about 10% cupric oxide, and the zone is at a temperature of about 2080° F. to produce thermistor elements having a maximum resistance value at about 77° F.

4. The method according to claim 2, wherein the thermistor material consists essentially of about 95% manganese dioxide and about 5% cupric oxide, and the zone is at a temperature of about 2125° F. to produce thermistor elements having a maximum resistance value at about 77° F.

References Cited in the file of this patent

UNITED STATES PATENTS

| 2,282,944 | Dearborn | May 12, 1942 |
| 2,329,511 | Christensen | Sept. 14, 1943 |
| 2,358,211 | Christenson | Sept. 12, 1944 |
| 2,664,486 | Colpitts | Dec. 29, 1953 |

FOREIGN PATENTS

| 625,501 | Great Britain | June 29, 1949 |

OTHER REFERENCES

Kingery: Ceramic Fabrication Processes, John Wiley and Sons, New York (1958), pages 201–213.